United States Patent [19]

Osterloh et al.

[11] 4,131,529

[45] Dec. 26, 1978

[54] PHOTOINITIATORS FOR PHOTOPOLYMERIZABLE COATING COMPOSITIONS

[75] Inventors: Rolf Osterloh, Ludwigshafen; Manfred Jacobi, Frankenthal; Werner Kuesters, Ludwigshafen, all of Fed. Rep. of Germany

[73] Assignee: BASF Aktiengesellschaft, Ludwigshafen, Fed. Rep. of Germany

[21] Appl. No.: 796,546

[22] Filed: May 13, 1977

[51] Int. Cl.$^2$ .................................. C08F 2/46; C08F 4/00
[52] U.S. Cl. ............................. 204/159.14; 96/115 P; 204/159.15; 204/159.16; 204/159.18; 204/159.19; 204/159.2; 204/159.23; 204/159.24; 260/837 R; 427/54; 428/417; 428/441; 428/442; 528/49; 528/75
[58] Field of Search .................. 204/159.23, 159.24, 204/159.18, 159.19, 159.14, 159.15, 159.16, 159.2; 96/115 P

[56] References Cited

U.S. PATENT DOCUMENTS

| 3,759,807 | 9/1973 | Osborn et al. | 204/159.23 |
|---|---|---|---|
| 3,825,479 | 7/1974 | Carlick et al. | 204/159.23 |
| 3,945,833 | 3/1976 | Sumita et al. | 96/115 R |

Primary Examiner—Richard B. Turer

Attorney, Agent, or Firm—Keil, Thompson & Shurtleff

[57] ABSTRACT

Photopolymerizable coating compositions contain, as the binder, olefinically unsaturated compounds having a boiling point above 50° C, together with from 0.5 to 15% by weight of photoinitiators, based on the binder. The photoinitiators are a mixture of an aromatic carbonyl compound A, which is a derivative of benzoin or benzil, which has at least one carbon-oxygen single bond in the α-position relative to the carbonyl group, an aromatic carbonyl compound B which is derived from benzophenone, fluorenone, anthraquinone, xanthene, thioxanthone or acridone, and an amine C of the general formula

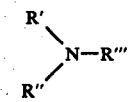

where R', R" and R''' are H, alkyl of 1 to 10 carbon atoms, cycloalkyl of 3 to 10 carbon atoms, aryl, hydroxyalkyl of 1 to 8 carbon atoms or alkoxyalkyl of 2 to 4 carbon atoms, but at most 2 substituents are H and at most 2 substituents are aromatic.

These coating compositions may be used for finishing various substrates, as fillers or as printing inks.

12 Claims, No Drawings

PHOTOINITIATORS FOR PHOTOPOLYMERIZABLE COATING COMPOSITIONS

The present invention relates to photopolymerizable coating compositions which contain olefinically unsaturated compounds as binders, together with a combination of various compounds as photoinitiator.

The polymerization of olefinically unsaturated compounds, containing photoinitiators, by irradiation with UV light has been disclosed. The patent literature discloses a large number of photoinitiators, some of which have already been put into practical use. However, these photoinitiators still suffer from certain disadvantages; above all, the rate of cure is in many cases not entirely satisfactory.

We have found that olefinically unsaturated compounds cure more rapidly when using certain photoinitiator combinations than when using the individual components alone. This unexpected effect becomes particularly clear when curing acrylic compounds in layers which are more than 10 μm thick.

The invention relates to photopolymerizable coating compositions which contain, as the binder, an olefinically unsaturated compound of boiling point above 50° C., together with from 0.5 to 15 percent by weight of a photoinitiator, based on the binder. The photoinitiator is a mixture of an aromatic carbonyl compound A of the general formula

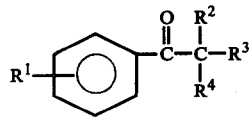  (I), an aromatic carbonyl compound B of the general formula

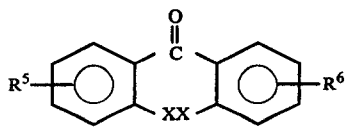  (II)

and an amine C of the general formula

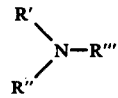  (III)

in which formulae $R^1$ is H, Cl, alkyl of 1 to 4 carbon atoms, alkoxy of 1 to 4 carbon atoms or alkoxyalkyl of 2 to 4 carbon atoms, $R^2$ is H, Cl or $R^1$-phenyl, and if (a) $R^2$ is H or Cl, $R^3$ and $R^4$ are H, Cl, alkyl of 1 to 4 carbon atoms or $R^1$-phenyl, while (b) if $R^2$ is $R^1$-phenyl, $R^3$ is alkoxy of 1 to 7 carbon atoms and $R^4$ is $R^3$, H, alkyl of 1 to 4 carbon atoms or $CH_2OH$, or $R^3$ and $R^4$ conjointly are a $O-C_n-H_{2n}-O$ bridge, where n is an integer from 2 to 8, $R^5$ and $R^6$ are H, alkyl of 1 to 5 carbon atoms, alkoxy of 2 to 5 carbon atoms, COOH, $COOR^7$ or $COON(R^7)_2$ (where $R^7$ is alkyl of 1 to 7 carbon atoms), Cl or chloroalkyl of 1 to 3 carbon atoms, X is H, a direct bond or an O, CO, S, NH or $NR^8$ bridge (where $R^8$ is alkyl of 1 to 5 carbon atoms), and R', R'' and R''' are H, alkyl of 1 to 10 carbon atoms, cycloalkyl of 3 to 10 carbon atoms, aryl, hydroxyalkyl of 1 to 8 carbon atoms or alkoxyalkyl of 2 to 4 carbon atoms, but at most 2 substituents are H and at most 2 substituents are aromatic.

The olefinically unsaturated compounds may have a molecular weight lying within a very wide range, from about 70 to 20,000; this means that both low molecular weight and high molecular weight compounds may be employed.

Examples of suitable high molecular weight compounds are:

1. Unsaturated polyesters having a molecular weight of from 500 to 5,000 and containing from 0.5 to 8 double bonds per 1,000 molecular weight units, these polyesters being manufactured from, for example,
    (a) from 10 to 70 percent by weight of α,β-unsaturated dicarboxylic acids, e.g., maleic acid, fumaric acid or itaconic acid,
    (b) from 0 to 60 percent by weight of saturated aliphatic, cycloaliphatic or aromatic dicarboxylic acids, e.g. succinic acid, adipic acid, tetrahydrophthalic acid, hexahydrophthalic acid, cyclohexane-1,4-dicarboxylic acid, phthalic acid, isophthalic acid or terephthalic acid,
    (c) from 20 to 80 percent by weight of aliphatic, cycloaliphatic or non-phenolic aromatic diols, e.g., ethylene glycol, diethylene glycol, triethylene glycol, propane-1,2-diol, propane-1,3-diol, butane-1,2-diol, butane-1,3-diol, butane-1,4-diol, but-2-ene-1,4-diol, neopentyl-glycol, hexane-1,6-diol or oxyalkylated bisphenol A,
    (d) from 0 to 5 percent by weight of tricarboxylic or tetracarboxylic acids, e.g., trimellitic acid, pyromellitic acid or benzenetetracarboxylic acid,
    (e) from 0 to 10 percent by weight of monocarboxylic acids, e.g., acetic acid, propionic acid or benzoic acid,
    (f) from 0 to 5 percent by weight of trifunctional or tetrafunctional alcohols, e.g., glycerol, trimethylolpropane or pentaerythritol and
    (g) from 0 to 10 percent by weight of monofunctional alcohols, e.g., methanol, ethanol, propanol or butanol;

2. Unsaturated epoxy resins (epoxide-acrylates) manufactured, for example, from
    (a) monofunctional epoxides and acrylic acid or methacrylic acid, by the method of U.S. Pat. No. 2,484,487,
    (b) bifunctional epoxides and unsaturated fatty acids, by the method of U.S. Pat. No. 2,456,408,
    (c) polyfunctional aromatic epoxides and crotonic acid, by the method of U.S. Pat. No. 2,575,440 or
    (d) polyfunctional aromatic or aliphatic fatty glycidyl ethers and acrylic acid or methacrylic acid, by the method of U.S. Pat. No. 2,824,851 or German laid-open application DOS No. 1,644,817;

3 Unsaturated polyurethanes (urethane-acrylates) obtained from hydroxyalkyl acrylates and diisocyanates, with or without polyols or polyamines, such polyurethanes being described, for example, in German laid-open applications DOS Nos. 1,644,797, 1,644,798 and 2,358,948;

4. Unsaturated copolymers, manufactured, for example, by reacting
    (a) copolymers, containing maleic anhydride groups, with unsaturated alcohols, for example by the method of German laid-open application DOS No. 2,050,893 or (b) acrylic ester copolymers containing carboxylic acid groups or polyesters containing carboxylic acid groups with unsaturated epoxides, e.g., glycidyl acrylates;

5. Butadiene polymers in which the double bonds are predominantly present as vinyl side chains;

6. Diallyl phthalate prepolymers; and

7. Poly-N-vinylurethanes, e.g., manufactured by the method of German laid-open application DOS No. 2,064,701, by reacting vinyl isocyanate with saturated or unsaturated polyester-polyols, polyether-polyols or polyfunctional alcohols.

Suitable low molecular weight compounds are:

1. Esters of unsaturated monocarboxylic acids or dicarboxylic acids, e.g., esters of acrylic acid, methacrylic acid, α-cyanacrylic acid, crotonic acid, cinnamic acid, sorbic acid, maleic acid, fumaric acid or itaconic acid with aliphatic, cycloaliphatic or aromatic-aliphatic monohydric to tetrahydric alcohols of 3 to 20 carbon atoms, e.g. methyl acrylate and methacrylate, n-, i-and t-butyl acrylate and methacrylate, 2-ethylhexyl acrylate, lauryl acrylate, dihydrodicyclopentadienyl acrylate and methacrylate, methylglycol acrylate, hydroxyethyl acrylate and methacrylate, hydroxypropyl acrylate and methacrylate, ethylene glycol diacrylate, diethylene glycol diacrylate, triethylene glycol diacrylate, neopentylglycol diacrylate and dimethacrylate, 1,4-dimethylolcyclohexane diacrylate, pentaerythritol triacrylate, tetraacrylate, trimethacrylate and tetramethacrylate, ethyl α-cyanacrylate, ethyl crotonate, ethyl sorbate, diethyl maleate, diethyl fumarate and the diacrylate and dimethacrylate of oxyalkylated bisphenol A;

2. Amides of acrylic acid or methacrylic acid which may or may not be substituted at the nitrogen by alkyl, alkoxyalkyl or hydroxyalkyl, e.g., N,N'-di-methylacrylamide, N-isobutylacrylamide, diacetone-acrylamide, N-methylolacrylamide, N-methoxymethylacrylamide, N-butoxymethylacrylamide, N-butoxymethylmethacrylamide and ethylene glycol bis-(N-methylolacrylamide) ether;

3. Vinyl esters of monocarboxylic acids or dicarboxylic acids of 2 to 20 carbon atoms, e.g., vinyl acetate, vinyl propionate, vinyl 2-ethylhexanoate, vinyl versatate and divinyl adipate;

4. Vinyl ethers of monohydric or dihydric alcohols of 3 to 20 carbon atoms, e.g., isobutyl vinyl ether, hexyl vinyl ether, octadecyl vinyl ether, ethylene glycol divinyl ether, diethylene glycol divinyl ether, butanediol divinyl ether and hexanediol divinyl ether;

5. Mono-N-vinyl compounds, e.g., N-vinylpyrrolidone, N-vinylpiperidone, N-vinylcaprolactam, N-vinylmorpholine, N-vinyloxazolidone, N-vinylsuccinimide, N-methyl-N-vinylformamide and N-vinylcarbazole; and 6. Allyl ethers and allyl esters, e.g., trimethylolpropane diallyl ether, trimethylolpropane triallyl ether, pentaerythritol triallyl ether, diallyl maleate, diallyl fumarate or diallyl phthalate.

Of course, the compounds listed may be employed individually or as mixtures with one another. Mixtures of epoxide acrylates or urethane-acrylates with low molecular weight monoacrylic, diacrylic or triacrylic compounds are particularly preferred. The olefinically unsaturated compounds have a boiling point above 50° C., preferably above 100° C. Lower-boiling compounds are less suitable since they evaporate too readily after application of the coating composition, before it has been cured. This can on the one hand alter the composition of the coating and on the other hand cause pollution of the environment by malodorous compounds, some of which are also toxic. Hence, compounds having a vapor pressure of less than about 10 mm Hg at 100° C. are particularly suitable for finishes and printing inks which do not pollute the environment.

The photoinitiator mixtures consist of at least two photoinitiators which react differently (compounds A and B) and an amine as a reducing agent (compound C).

The following conventional compounds are suitable for use as photoinitiators A: derivatives of benzoin or benzil, which all have at least one carbon-oxygen single bond in the α-position relative to the carbonyl group. These compounds react, in the UV-excited state, by scission of the carbon-carbon bond in the α-position relative to the carbonyl group, to form a pair of free radicals. Benzil dialkylketals, which are described in detail in German laid-open applications DOS Nos. 2,232,365, 2,261,383 and 2,337,813, and benzoin ethers as described in U.S. Pat. No. 2,448,828 and German printed application DAS No. 1,694,149 are particularly perferred. Aromatic α-haloketones, e.g., trichloroacetophenone, may also be used.

The photoinitiator (A) is in general present in the coating compositions according to the invention in amounts of from 0.1 to 10%, preferably from 0.1 to 5%, by weight, based on the binder.

The second group of photoinitiators B comprises compounds which are derived from benzophenone, fluorenone, anthraquinone, xanthone, thioxanthone or acridone. These categories of compounds are described, for example, in U.S. Pat. No. 3,759,807. Benzophenone, 2-methylthioxanthone and 2-chlorotrioxanthone are particularly preferred.

The photoinitiator (B) is in general present in the coating compositions in amounts of from 0.1 to 10%, preferably from 0.1 to 5%, by weight, based on the binder.

The organic amines (C) act as reducing agents or chain transfer compounds. They should preferably possess at least one

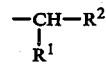

group in the α-position relative to the nitrogen. Examples of suitable amines are primary, secondary and tertiary aliphatic, aromatic or heterocyclic amines, as listed, for example, in U.S. Pat. No. 3,759,807. Hydroxyalkylamines, e.g., triethanolamine, ethanolamine, diethanolamine, N-methyldiethanolamine, 3-isopropxypropylamine and similar alkoxyalkylamines are particularly active. The organic amine (C) is in general present in the coating composition according to the invention in amounts of from 0.2 to 14%, preferably from 0.2 to 10%, by weight, based on the binder, the amount of component (C) being at least 25% of the sum of components (A) + (B), preferably from one to five times the amount of (A) + (B).

To achieve special effects, inorganic or organic pigments, e.g., titanium dioxide, or fillers, e.g., talc, may be added to the coating compositions, in amounts of up to 60 percent by weight, based on the composition. Furthermore, the organic additives conventionally used in the surface-coating industry, e.g., thixotropic agents, flow control agents, further binders, deaerating agents or lubricants, may be present in amounts of up to 10 percent by weight.

The coating compositions of the invention may be used for finishing substrates such as wood, metal, paper or plastics, and may also be used as fillers or printing inks.

The compositions are cured by irradiation with UV light of wavelength from 230 to 450 nm, high pressure mercury lamps being used in particular.

In the Examples, parts and percentages are by weight, unless stated otherwise.

EXAMPLE 1

A 65 percent strength solution, in butanediol diacrylate, of a reaction product of 1 mole of bisphenol-A diglycidyl ether with 2 moles of acrylic acid was prepared. The photoinitiators listed in Table 1 were added to this solution. A 60 μm thick layer of the clear finishes thus obtained was knife-coated onto glass plates and irradiated with a mercury high pressure lamp (output 80 Watt/cm of arc length, measured on the quartz glass cylinder of the tubes). The distance between the lamp and the coating film was 10 cm.

The samples were passed under the UV lamp on a conveyor belt running at an infinitely variable speed.

The conveyor belt speed (m/min) at which a scratch-resistant cured film was just still obtainable was determined. In addition, the Konig pendulum hardness (DIN 53,157) was measured.

TABLE 1

| Photoinitiator added (% by weight) | Maximum belt speed (m/min) | Pendulum hardness (sec.) |
|---|---|---|
| 2 Benzil dimethylketal (BDMK) | 11 | 188 |
| 4 " | 16 | 193 |
| 2 " + 3 methyldiethanolamine | 31 | 146 |
| 4 " + 3 " | 31 | 156 |
| 2 Benzophenone (Bz) | <11 | — |
| 4 " | <11 | — |
| 2 " + 3 methyldiethanolamine | 11 | 61 |
| 4 " + 3 " | 16 | 56 |
| 1 BDMK and 1 Bz + 3 methyldiethanolamine | 53 | 98 |
| 2 BDMK and 1 Bz + 3 " | 53 | 120 |
| 2 BDMK and 2 Bz + 3 " 41 | 72 | 115 |

The last three experiments are in accordance with the invention.

EXAMPLE 2

As in Example 1, the clear finish used was a 65 percent strength solution, in butanediol diacrylate, of a reaction product of 1 mole of bisphenol-A-diglycidyl ether and 2 moles of acrylic acid. The photoinitiator added was a combination of 2 percent by weight of p-tert.-butyl-ω,ω,ω-trichloroacetophenone, 2 percent by weight of benzophenone and 3 percent by weight of methyldiethanolamine. The maximum belt speed was 31 m/min.

EXAMPLE 3

The clear finish described in Example 1 was used. The photoinitiators added were as shown in Table 2. Curing was carried out as described in Example 1.

TABLE 2

| Photoinitiator added (% by weight) | Belt speed (m/min) | Pendulum hardness (sec.) |
|---|---|---|
| 4 Benzoin isopropyl ether (BPE) | 11 | 180 |
| 2 BPE + 3 methyldiethanolamine (MDEA) | 11 | 160 |
| 4 BPE + 3 MDEA | 16 | 160 |
| 2 BPE + 3 MDEA + 2 benzophenone | 45 | 120 |
| 0.1 Methylthioxanthone (MTX) + 3 MDEA | 11 | 118 |
| 2 BDMK + 3 MDEA | 31 | 146 |

TABLE 2-continued

| Photoinitiator added (% by weight) | Belt speed (m/min) | Pendulum hardness (sec.) |
|---|---|---|
| 0.1 MTX + 2 BDMK + 3 MDEA | 60 | 140 |

EXAMPLE 4

A 70% strength solution, in butanediol diacrylate, of a reaction product of 1 mole of isophorone diisocyanate and 2 moles of hydroxypropyl acrylate was prepared. This solution was diluted with 10% of hydroxypropyl acrylate. The photoinitiators shown in Table 3 were added to the mixture. Curing was carried out as described in Example 1.

TABLE 3

| Photoinitiator added | | Maximum belt speed (m/min) |
|---|---|---|
| a) | 2% by weight of benzil dimethylketal 2% by weight of benzophenone 3% by weight of methyldiethanolamine | 53 |
| b) | 2% by weight of benzil dimethylketal 3% by weight of methyldiethanolamine | 11 |
| c) | 2% by weight of benzophenone 3% by weight of methyldiethanolamine | <11 |

We claim:

1. A photopolymerizable coating composition which contains, as the binder, an olefinically unsaturated compound of boiling point above 50° C., together with from 0.5 to 15 percent by weight of a photoinitiator, based on the binder, the photoinitiator comprising a mixture of:

(A) an aromatic carbonyl compound of the formula

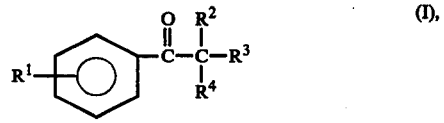

(B) an aromatic carbonyl compound of the formula

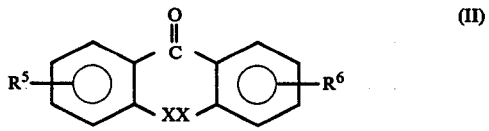

and (C) an amine of the formula

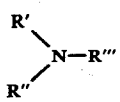

(III)

wherein in formulae I, II and III,

R¹ is H, Cl, alkyl of 1 to 4 carbon atoms, alkoxy of 1 to 4 carbon atoms or alkoxyalkyl of 2 to 4 carbon atoms, R² is H, Cl or R¹-phenyl, and if (a) R² is H or Cl, R³ and R⁴ are H, Cl, alkyl of 1 to 4 carbon atoms or R¹-phenyl, while (b) if R² is R¹-phenyl, R³ is alkoxy of 1 to 7 carbon atoms and R⁴ is R³, H, alkyl of 1 to 4 carbon atoms or CH$_2$OH, or R³ and R⁴ conjointly are a O—C$_n$—H$_{2n}$—O bridge, where n is an integer from 2 to 8, R⁵ and R⁶ are H, alkyl of 1 to 5 carbon atoms, alkoxy of 2 to 5 carbon atoms, COOH, COOR⁷ or COON(R⁷)$_2$ (where R⁷ is alkyl of 1 to 7 carbon atoms), Cl or chloroalkyl of 1 to 3 carbon atoms, X is H, a direct bond or an O, CO, S, NH or NR⁸ bridge (where R⁸ is alkyl of 1 to 5 carbon atoms), and R', R" and R'" are H, alkyl of 1 to 10 carbon atoms, cycloalkyl of 3 to 10 carbon atoms, aryl, hydroxyalkyl of 1 to 8 carbon atoms or alkoxyalkyl of 2 to 4 carbon atoms, with the proviso that at most 2 substituents are H and at most 2 substituents are aromatic.

2. A photopolymerizable coating composition as set forth in claim 1, wherein the amine (C) is present in an amount of at least 25 percent by weight of the sum of the components (A) + (B).

3. A photopolymerizable coating composition as set forth in claim 2, wherein the components (A) and (B) of the photoinitiator are each employed in amounts of from 0.1 to 10% by weight, based on binder.

4. A photopolymerizable coating composition as set forth in claim 1, wherein the aromatic carbonyl compound (A) is a benzil dialkylketal, a benzoin ether on an aromatic α-haloketone.

5. A photopolymerizable coating composition as set forth in claim 1, wherein the aromatic carbonyl compound (B) is benzophenone, 2-methylthioxanthone or 2-chlorothioxanthone.

6. A photopolymerizable coating composition as set forth in claim 1, wherein the amine (C) is a hydroxyalkylamine.

7. A photopolymerizable coating composition as set forth in claim 1, wherein the photoinitiator is a mixture of (A) benzil dimethylketal or benzoin isopropyl ether, (B) benzophenone or methylthioxanthone and (C) methyldiethanolamine.

8. A photopolymerizable coating composition as set forth in claim 1, wherein the binder is an unsaturated polyester having a molecular weight of from 500 to 5,000 and containing from 0.5 to 8 double bonds per 1,000 molecular weight units, an unsaturated epoxy resin, an unsaturated polyurethane obtained from a hydroxyalkyl acrylate and a diisocyanate, a butadiene polymer, a diallyl phthalate prepolymer or a poly-N-vinylurethane.

9. A photopolymerizable coating composition as set forth in claim 1, wherein the binder is an ester of an unsaturated monocarboxylic or dicarboxylic acid and an aliphatic, cycloaliphatic or aromatic-aliphatic monohydric to tetrahydric alcohol of 3 to 20 carbon atoms, an amide of acrylic or methacrylic acid, a vinyl ester of a monocarboxylic or dicarboxylic acid of 2 to 20 carbon atoms, a vinyl ether of a monohydric or dihydric alcohol of 3 to 20 carbon atoms, a mono-N-vinyl compound or an allyl ether or allyl ester.

10. A photopolymerizable coating composition as set forth in claim 1, wherein the binder is a mixture of an epoxide acrylate or urethane-acrylate with a low molecular weight monoacrylic, diacrylic or triacrylic compound.

11. A photopolymerizable coating composition as set forth in claim 1, wherein the binder is a mixture of the reaction product of bisphenol-A diglycidyl ether with acrylic acid and a low molecular weight acrylic ester.

12. A photopolymerizable coating composition as set forth in claim 1, wherein the binder is a mixture of the reaction product of a diisocyanate with a hydroxyalkyl acrylate and a low molecular weight acrylic ester.

* * * * *

UNITED STATES PATENT AND TRADEMARK OFFICE
CERTIFICATE OF CORRECTION

PATENT NO. : 4,131,529
DATED : December 26, 1978
INVENTOR(S) : OSTERLOH ET AL

It is certified that error appears in the above-identified patent and that said Letters Patent are hereby corrected as shown below:

In the heading, after section "[22] Filed:

May 13, 1977" insert the following heading:

--[30]  Foreign Application Priority Data

June 5, 1976  Fed. Rep. of Germany . .2625538--.

Signed and Sealed this

Twenty-sixth Day of June 1979

[SEAL]

Attest:

RUTH C. MASON
Attesting Officer

DONALD W. BANNER
Commissioner of Patents and Trademarks